United States Patent [19]

Steilen et al.

[11] 4,311,104
[45] Jan. 19, 1982

[54] PRESS GRAIN DRILL

[75] Inventors: Ronald M. Steilen; Lester D. Schreiner, both of Ankeny, Iowa

[73] Assignee: Deere & Company, Moline, Ill.

[21] Appl. No.: 761,247

[22] Filed: Jan. 21, 1977

[51] Int. Cl.³ .............................................. A01C 5/06
[52] U.S. Cl. .................................... 111/85; 111/59;
111/60; 111/61; 111/62; 111/66; 111/68;
111/86; 172/176; 172/397; 172/462; 172/484;
172/672; 172/705; 172/706
[58] Field of Search ............... 172/264, 265, 458, 462,
172/483, 484, 397, 417, 497–500, 538, 551, 573,
624, 657, 661, 668, 705, 706, 175, 176, 198, 444,
298, 307, 293, 295, 672, 195, 196, 443, 448, 463,
467, 605, 474, 480, 482; 111/84, 86, 85, 52,
59–68, 55, 71, 81, 83, 18, 22, 24

[56] References Cited

U.S. PATENT DOCUMENTS

| | | | |
|---|---|---|---|
| 402,677 | 5/1889 | Lathrop | 111/85 |
| 404,108 | 5/1889 | Patric et al. | 111/66 |
| 1,111,175 | 9/1914 | Packham et al. | 111/66 |
| 1,601,039 | 9/1926 | Pereda | 111/52 |
| 1,854,811 | 4/1932 | Sonander | 111/84 |
| 1,864,280 | 6/1932 | Scarlett | 111/52 |
| 1,869,516 | 8/1932 | Siemienski | 111/81 |
| 1,902,924 | 3/1933 | Wamhoff et al. | 111/63 |
| 2,318,205 | 5/1943 | Drennan | 111/62 |
| 2,631,513 | 3/1953 | Silver et al. | 172/307 X |
| 2,698,114 | 12/1954 | Buhr | 111/67 X |
| 2,902,954 | 9/1959 | Stilwell | 111/52 |
| 3,237,702 | 3/1966 | Orendorff | 172/705 |
| 3,336,885 | 8/1967 | Lebow | 111/85 |
| 3,543,704 | 12/1970 | Hansen et al. | 111/52 |
| 3,708,019 | 1/1973 | Ryan | 172/705 X |

FOREIGN PATENT DOCUMENTS

| | | | |
|---|---|---|---|
| 49581 | 4/1889 | Fed. Rep. of Germany | 172/484 |
| 385587 | 12/1923 | Fed. Rep. of Germany | 111/85 |
| 801180 | 11/1950 | Fed. Rep. of Germany | 111/73 |
| 1381974 | 11/1964 | France | 172/500 |
| 873737 | 7/1961 | United Kingdom | 111/85 |

OTHER PUBLICATIONS

John Deere Operators Manual Om-A33-554, 9/55 "Bedders & Planters," p. 24 and p. 60.

*Primary Examiner*—Steven A. Bratlie
*Attorney, Agent, or Firm*—Fraser and Bogucki

[57] ABSTRACT

A press grain drill includes a plurality of opener units mounted on an elongated tow tube and including a plurality of elongated, pivotably coupled elements forming a pair of parallelograms which support a self-penetrating shovel and a press wheel respectively. A first one of the parallelograms permits up and down movement of the shovel relative to the tow tube while maintaining the pitch of the shovel relative to the ground substantially constant. A second one of the parallelograms responds to each movement of the shovel to move the press wheel in the same direction and relative to the shovel so as to maintain the depth of the shovel within the ground substantially constant. Whenever the tow tube which is coupled by pairs of parallel links to an elongated main frame tool bar is raised relative to the tool bar for towing, a lift tube coupled to the links via bracket numbers engages the opener units to lift them relative to the tow tube.

23 Claims, 12 Drawing Figures

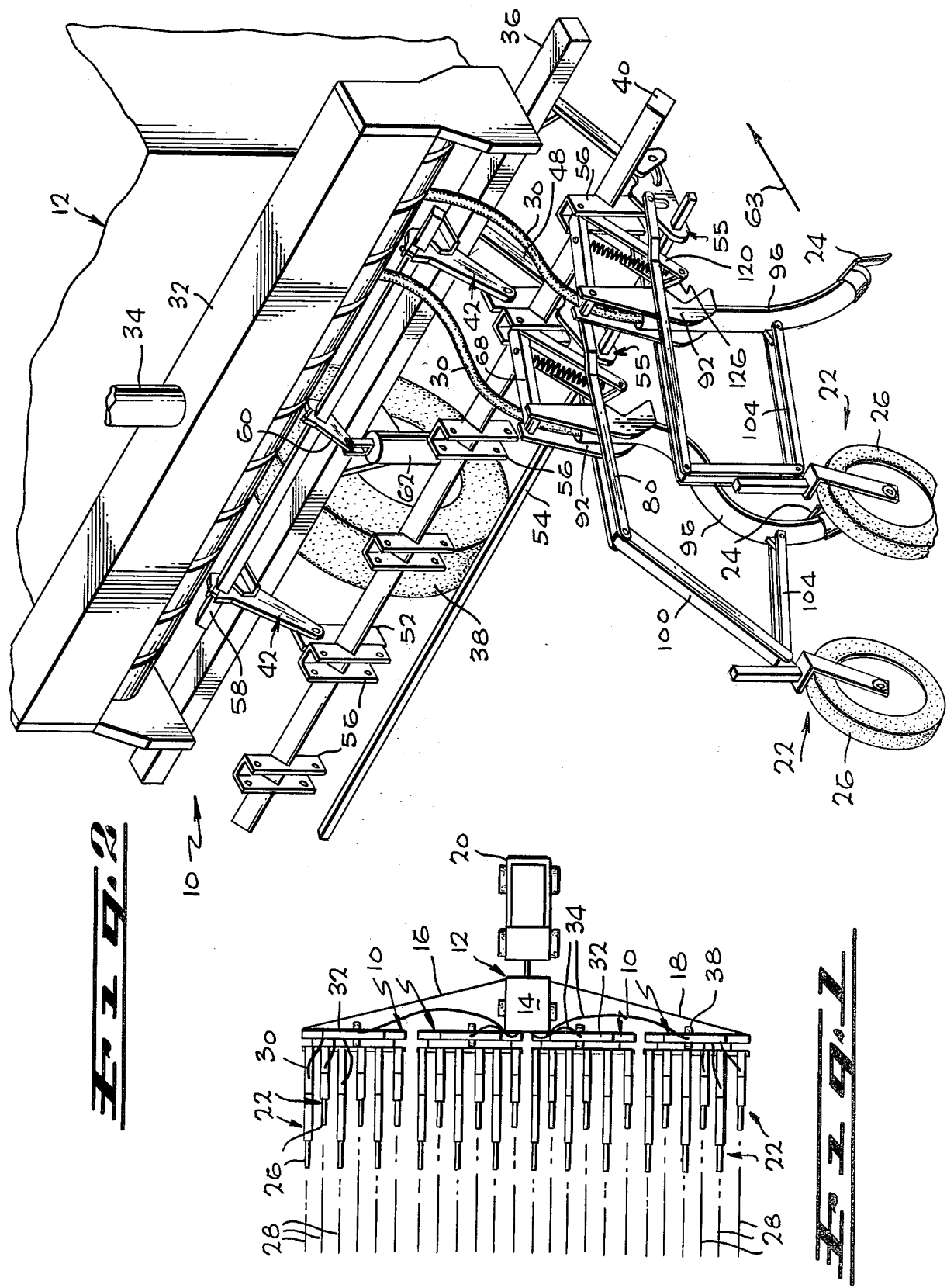

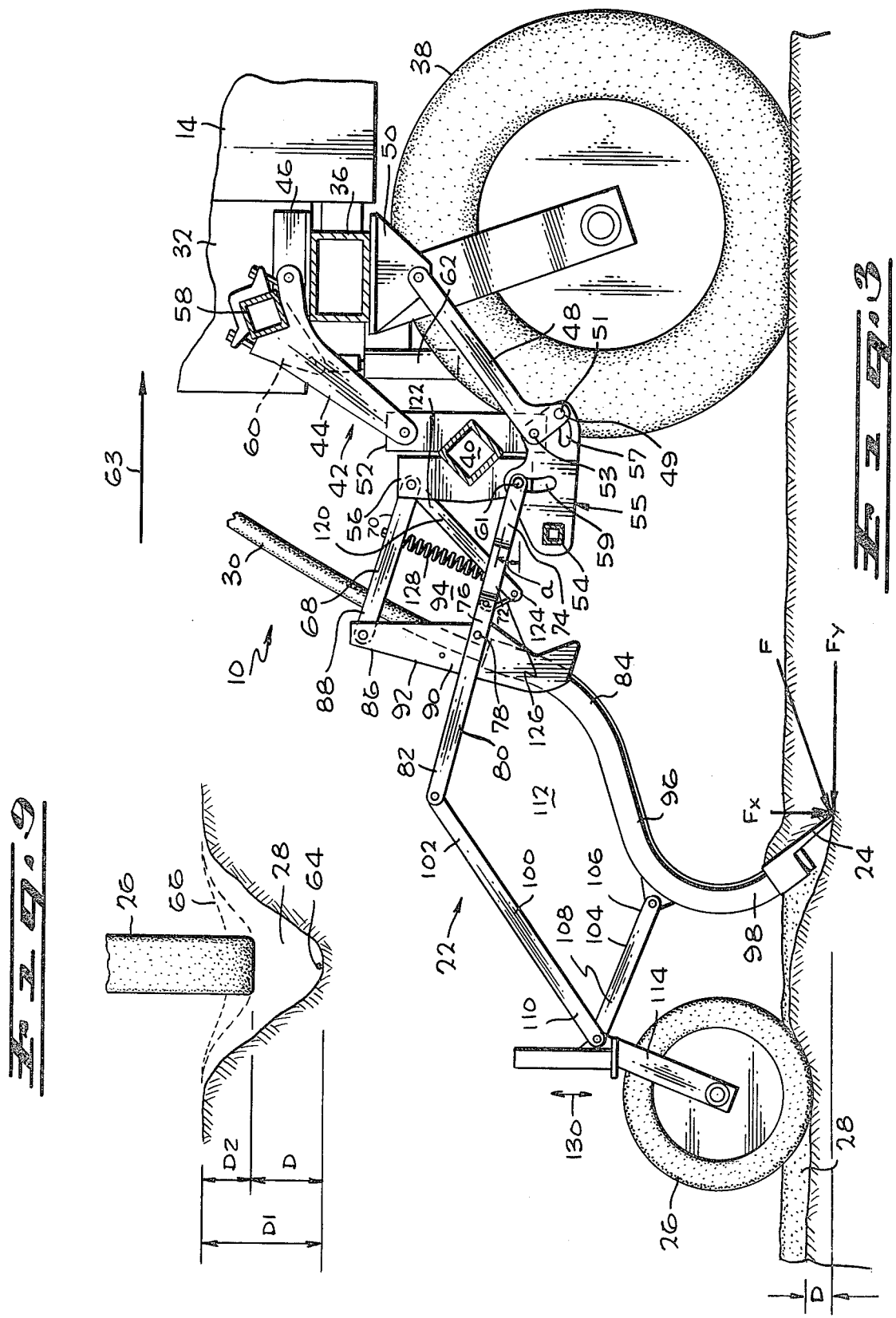

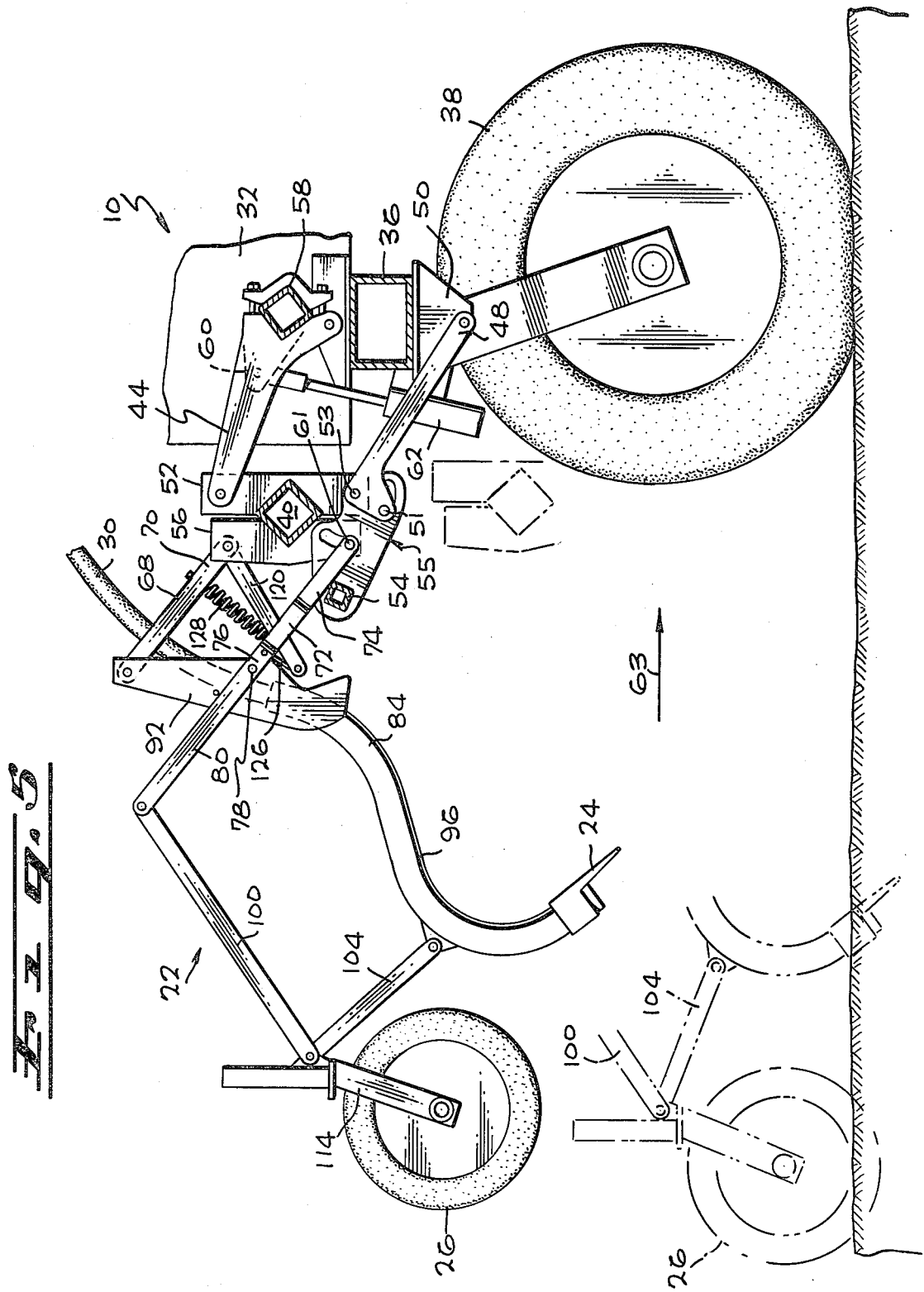

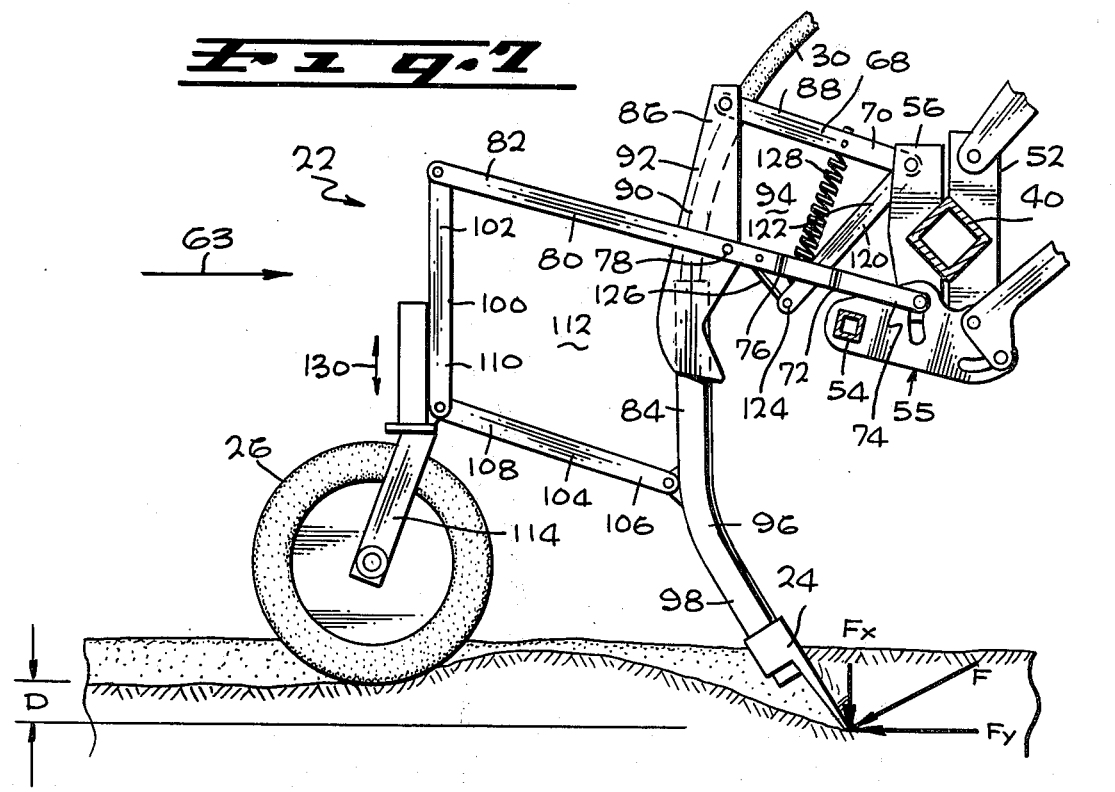
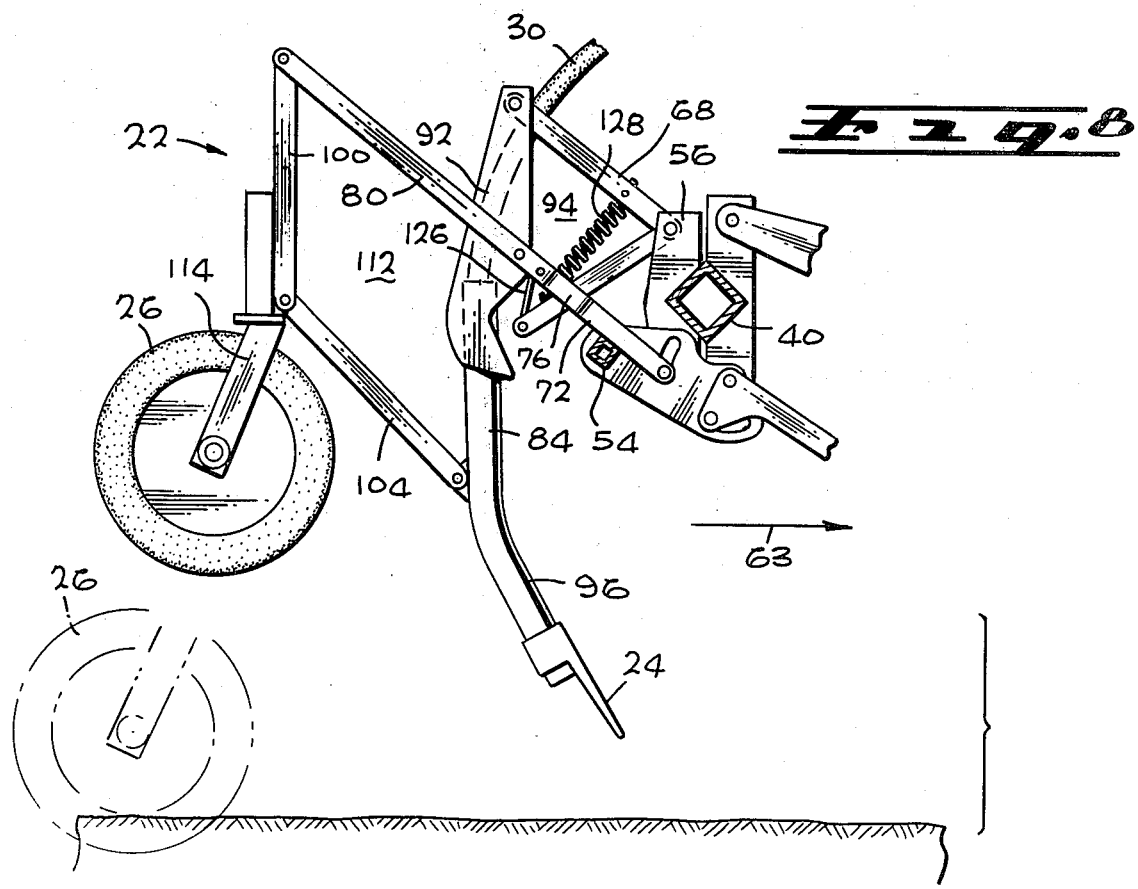

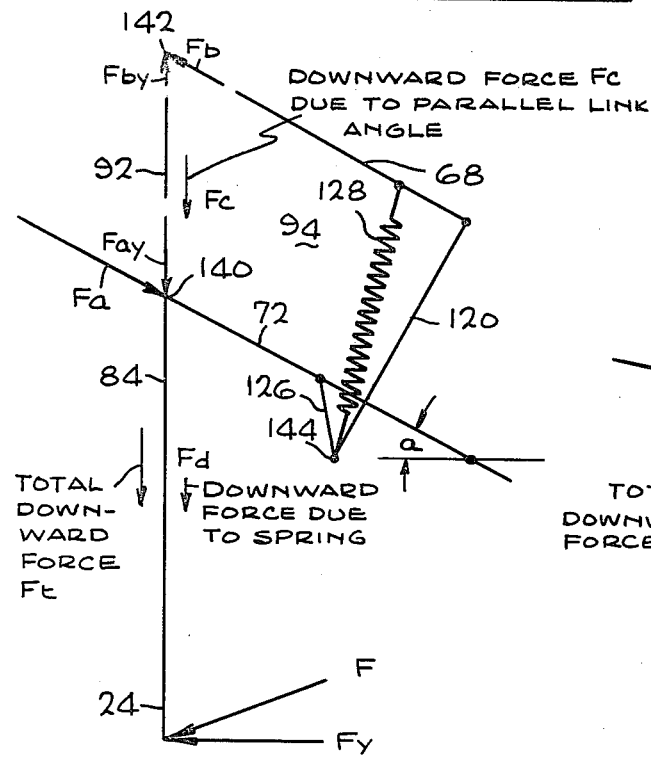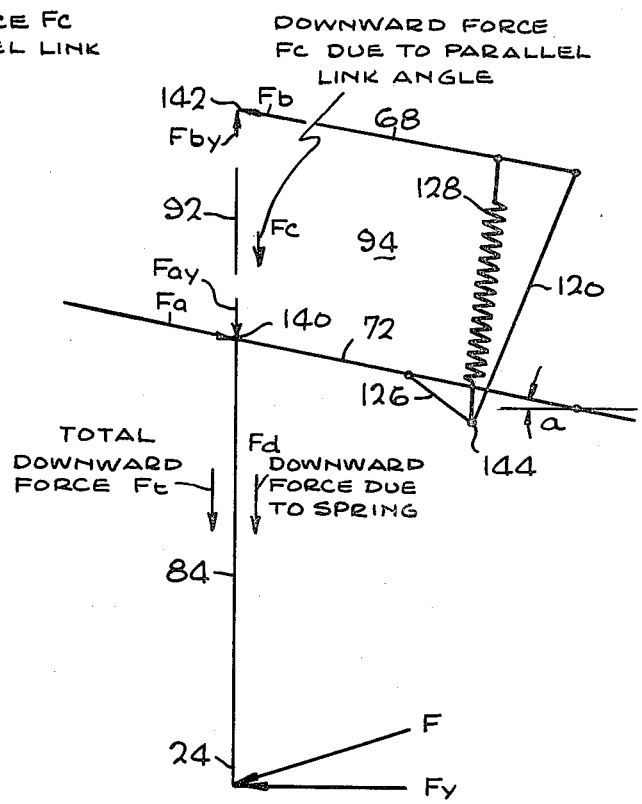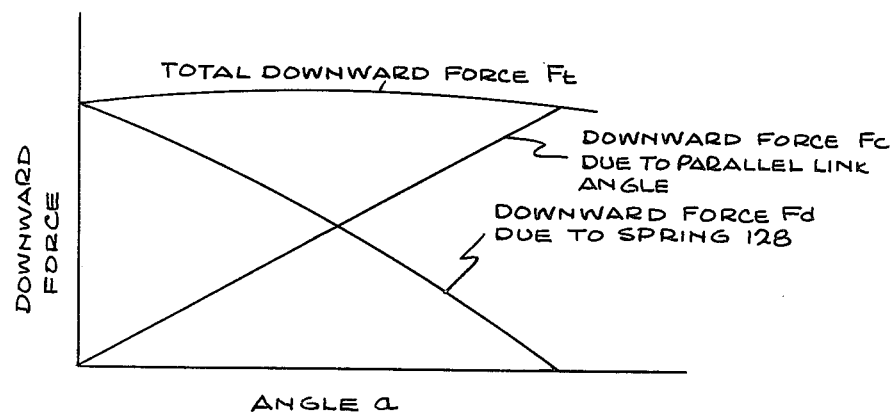

PRESS GRAIN DRILL

BACKGROUND OF THE INVENTION

1. Field of the Invention

The present invention relates to press grain drills, and more particularly to arrangements in which each of a plurality of opener units has a shovel for digging a furrow of desired depth and depositing seed therein and a following press wheel for compacting soil over the seeds at a selected depth.

2. History of the Prior Art

Grain drills form a well-known and useful part of available farm machinery. Such units typically employ a plurality of shovels generally equally spaced along the length of the unit for digging a plurality of parallel furrows in the ground as the unit is towed over the ground. The shovels are coupled such as by hoses to receive a continuous supply of seeds. The seeds are deposited in the soil by the shovels as the furrows are dug. The grain drill may be towed as a single unit or as a plurality of interconnected units by an appropriate vehicle such as a tractor. An example of a grain drill is provided by U.S. Pat. No. 3,628,611 of Carlson, issued Dec. 21, 1971.

It is common practice in grain drills to provide each shovel with a following press wheel. Each press wheel follows the associated shovel in the furrow created by the shovel and runs at a depth which is normally less than that of the shovel because of soil returning or flowing back into the furrow ahead of the press wheel. An example of a grain drill utilizing press wheels is provided by U.S. Pat. No. 3,402,938, McCallum, issued Sept. 24, 1968.

Presently known grain drills suffer from a number of limitations. One such problem relates to the need for a relatively heavy object such as a seed box mounted on the drill to provide for penetration of the shovels in the ground. The presence of the heavy and cumbersome seed box makes it difficult to design drills which can be easily folded or otherwise rearranged for ease of transport and maneuvering. Another problem stems from the fact that the drills are incapable of maintaining substantially constant shovel and press wheel depths as the level of seed in the seed box varies and as soil or terrain irregularities occur. As the seed level in the seed box decreases and the weight of the box decreases, shovel penetration decreases. Frequently the shovels are spring loaded in a vertical direction for maintaining penetration in the ground. Factors such as variations in the terrain vary the spring tension and thereby the downward force and the penetration of the shovel. Consequently, compactness of soil around the seeds varies considerably. It is known that the latter is extremely important with respect to the proper germination of the seed, it being understood that a proper and uniform compactness would be desirable if at all possible.

Still further problems may reside in the design of the supporting wheeled framework for the drill unit and the manner in which the shovels and associated press wheels are raised to provide clearance during towing to and from the job and are lowered into the operative positions while on the job.

Accordingly, it is an object of the present invention to provide an improved press grain drill.

A more specific object of the invention is to provide a press grain drill in which individual opener units include a shovel which is self-penetrating and a press wheel which undergoes vertical movement at a rate greater than that of the shovel for changes in the position of the drill so as to maintain the shovel and press wheel at substantially constant depths within the ground.

Still further objects in accordance with the invention are to provide a press grain drill which exerts a substantially constant downward force on the press wheel and shovel independent of the positions of the shovel and press wheel to provide for uniform soil compaction despite terrain irregularities and the like.

It is a still further object of the present invention to provide a press grain drill in which the individual opener units may be conveniently raised for towing and lowered into the operative position for plowing, seeding and compacting.

BRIEF DESCRIPTION OF THE INVENTION

Press grain drills in accordance with the invention include a plurality of opener units which function in such a way that the rates of change of vertical positions of the shovel and press wheel are different and in a fixed ratio with respect to one another. Consequently, for every upward or downward movement of given distance of the shovel, there is a corresponding upward or downward movement of greater distance of the press wheel. The ratio of the rates of movement is adjustable, and once adjusted is constant. Such an arrangement permits the use of a self-penetrating shovel, thereby eliminating the need for a seed box or other heavy object on the opener unit, and has been found to maintain the shovel and press wheel at substantially constant depths within the soil independent of at least minor up and down movement of the opener unit in response to such things as variable terrain. Accordingly, the difference between the depths of the shovel and press wheel remains substantially constant to provide a compacted layer of soil of substantially uniform thickness over the deposited seeds.

The assemblage of elongated elements forms a pair of parallelograms which are variable in shape with movements of the shovel and press wheel relative to the unit frame, and which are dependent on each other and share certain common elongated elements. Preferably, the arrangement comprises first and second elongated elements parallel to one another and pivotally coupled to the unit frame, and a third elongated opener tube element pivotally coupled to the first and second elements at its upper end and intermediate portion respectively, and having the shovel attached to the lower end thereof. The first, second and third elongated elements combine with the frame to define the first parallelogram which changes in shape to permit upward and downward movement of the shovel relative to the frame. The second parallelogram is formed by the lower portion of the third elongated opener tube element and a portion of the second elongated element which extends beyond the third elongated element together with fourth and fifth elongated elements pivotally coupled to each other at a point where the press wheel is mounted thereto and to the second and third elongated elements. The resulting arrangement translates each movement of the shovel relative to the frame into a corresponding movement of the press wheel relative to the frame at a different and greater rate of change to the self-penetrating shovel at a desired depth within the ground. The fixed ratio of rates of movement of the shovel and press wheel is determined by the relative lengths of the adjoining portions of the second elongated element bounding the first and second parallelograms respectively. The difference between the depths of the shovel and the press wheel can be varied by adjusting the point of coupling of the press wheel to the pivoting joint between the fourth and fifth elongated elements.

The opener unit is preferably provided with a biasing arrangement for urging the arrangement downwardly and into a nominal horizontal position. In one such arrangement, a sixth elongated element is pivotably coupled to the first elongated element at the frame and the opposite end thereof is coupled to a seventh elongated element of relatively short length coupled to the second elongated element. A spring couples the pivotable junction between the sixth and seventh elements to the first elongated element so as to exert a downward force on the shovel and the press wheel via the various elongated elements which increases as a horizontal position is approached. This spring force combines with the downward component of force exerted on the opener unit in response to the horizontal component of the draft load of the ground on the shovel to provide a substantially constant downward force on the opener unit for different positions of the assemblage. These downward forces further combine with the substantially constant vertical component of the draft load on the shovel and the constant weight of the opener unit to make the unit self-penetrating at constant desired depths and to provide constant press wheel contact pressure and thereby uniform soil compaction over the deposited seeds.

Press drill units in accordance with the invention have an elongated main frame tool bar supported parallel to and a substantially fixed distance from the ground by at least one castored wheel. The first and second elongated elements of the various opener units are pivotably coupled to an elongated tow tube forming an auxiliary frame disposed in parallel, spaced-apart relation to the main frame by pairs of links pivotably coupled to both the auxiliary frame and the main frame. The interconnecting links allow the auxiliary frame to normally reside in an operative position at a substantially fixed first distance above the ground to position the shovels and the press wheels of the opener units at the desired depths within the ground. In preparation for towing of the press grain drill, however, hydraulic cylinders act on the pairs of links to raise the auxiliary frame relative to the main frame into a second or towing position in which the auxiliary frame is at a substantially fixed second distance from the ground greater than the first distance. Bracket members coupled to the links and mounting a transverse lift tube pivot in response to upward movement of the links as the auxiliary frame is raised into the second position to engage the second elongated element of the opener unit with the lift tube and pivot the first and second elongated elements through an angle greater than the angle of movement of the links. This insures that the shovel and press wheel are positioned well above the ground in response to nominal upward movement of the auxiliary frame from the first to the second position. When the auxiliary frame is in the first or operative position the lift tube is disposed below and well clear of the second elongated element of the opener unit so as not to interfere with normal up and down movement of the opener unit. However, excessive downward movement of the opener unit such as might occur upon passage over a ditch is prevented by the lift tube engaging the second elongated element of the opener unit after the opener unit has undergone its maximum permissible downward movement.

BRIEF DESCRIPTION OF THE DRAWINGS

The foregoing and other objects, features and advantages of the invention will be apparent from the following more particular description of preferred embodiments of the invention, as illustrated in the accompanying drawings, in which:

FIG. 1 is a perspective view of an arrangement illustrating the manner in which a plurality of press grain drills in accordance with the invention are typically used;

FIG. 2 is a perspective view of a press grain drill in accordance with the invention;

FIG. 3 is a sectional view of a portion of the drill of FIG. 2 illustrating one type of opener unit used therein;

FIG. 5 is a sectional view similar to that of FIG. 3, but with the drill raised into the towing position;

FIG. 7 is a sectional view of a portion of the drill of FIG. 2 illustrating a second type of opener unit used therein;

FIG. 8 is a sectional view similar to that of FIG. 7, but with the drill raised into the towing position;

FIG. 9 is a diagrammatic illustration of a plowed furrow illustrating the manner in which opener units according to the invention compact soil to a desired depth;

FIG. 10 is a diagrammatic representation of a portion of an opener unit in accordance with the invention illustrating the manner in which the spring force combines with the force from the draft load in the shovel to produce a total downward force;

FIG. 11 is a diagrammatic representation similar to that of FIG. 10 but with the opener unit at a different angular position and illustrating that the total downward force remains constant; and FIG. 12 is a diagrammatic plot of the downward forces shown in FIGS. 10 and 11 as a function of angular position of the opener unit.

DETAILED DESCRIPTION

Figure 4:
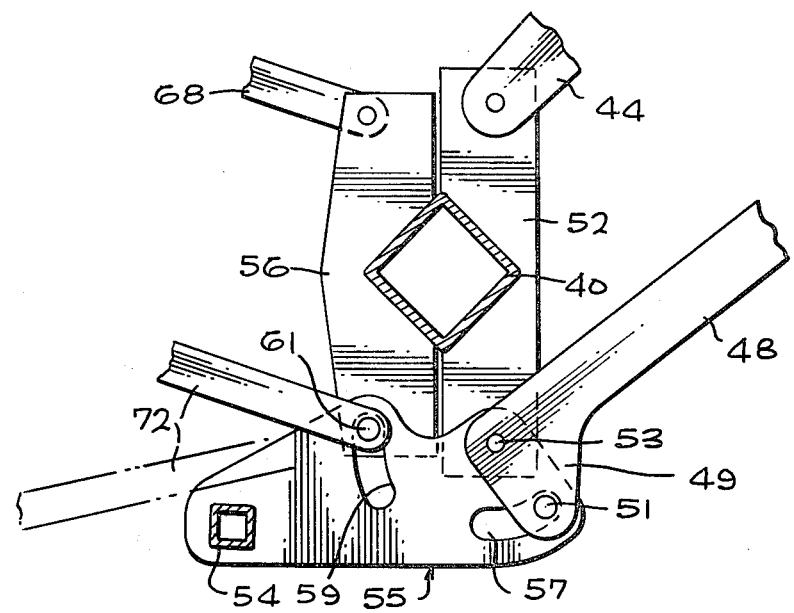
FIG. 4 is an enlarged side view of part of the drill portion shown in FIG. 3.

FIG. 1 depicts a typical arrangement using a plurality of press grain drills 10 in accordance with the invention. In the particular example of FIG. 1, four of the press grain drills 10 are illustrated, although it should be understood that other numbers can be used depending upon the terrain as well as on other factors.

The two outer press grain drills 10 are connected to the inner press grain drills 10 which are in turn connected to the rear of a trailer 12 having a central seed hopper 14 mounted thereon. The outer press grain drills 10 are coupled to the forward end of the trailer 12 via cables 16 and 18. The trailer 12 is in turn towed by a tractor 20.

Each of the press grain drills 10 has a plurality of opener units 22 mounted thereon. Each opener unit 22 includes a shovel 24 and a following press wheel 26. As is well known in the art, towing of the press grain drills 10 causes the various shovels 24 to dig a plurality of spaced-apart furrows 28. As the furrows 28 are being dug, the shovels 24, which have hollow interiors, deposit grain seeds supplied by hoses 30 which couple each shovel 24 to a seed dispenser 32 mounted on each of the press grain drills 10. The seed dispensers 32, which receive grain seeds from the central seed hopper 14 via a plurality of hoses 34, meter distribution of seed via the hoses 30 to the shovels 24.

Each of the press wheels 26 follows an associated one of the shovels 24 in the furrow 28 created by the shovel, and compacts the loose soil within the furrow over the deposited grain seeds to a selected depth.

A press grain drill 10 is shown in FIG. 2. As shown in FIG. 2, the drill 10 includes an elongated main frame tool bar 36 having a castored wheel 38 coupled to the underside thereof. Only one wheel 38 is needed since the opposite end of the tool bar 36 is coupled either to the trailer 12 or to the end of an adjacent press grain drill 10. Mounted on the top of the tool bar 36 is one of the seed dispensers 32. The dispenser 32 receives a continuous supply of seed from the central seed hopper 14 via the hose 34. The seed dispenser 32 meters the seed for distribution to the various opener units 22 via the hoses 30.

In accordance with the invention, the press grain drill 10 includes a liftable auxiliary frame in the form of an elongated tow tube 40 disposed in parallel, spaced-apart relation to the main frame tool bar 36. The tow tube 40, which is approximately equal in length to the tool bar 36, is coupled to the tool bar 36 by pairs of parallel links 42 spaced along the lengths of the tow tube 40 and the tool bar 36. As seen in FIGS. 3 and 4, each pair of parallel links 42 includes an upper link 44 pivotably coupled at one end thereof to a bracket 46 secured to the top of the tool bar 36, and a lower link 48 pivotably coupled at one end to a bracket 50 secured to the underside of the tool bar 36. The opposite ends of the links 44 and 48 are respectively pivotably coupled to the upper and lower ends of a bracket 52 secured to the tow tube 40. The lower link 48 extends and is pivotably connected to the bracket 52 by a pin 53. Also carried on the pin 53 is an arm or bracket member 55 having front and rear arcuate slots 57, 59 respectively. The bracket member 55 mounts a transverse lift tube 54. The lift tube 54 is approximately equal in length to the tow tube 40, and is disposed in parallel, spaced-apart relation therewith. Mounted on the opposite side of the tow tube 40 from each bracket 52 is a bracket 56 which carries a pin 61 that is received in the slot 59 of the bracket member 55. Each lower link 48 flares downwardly at an end portion 49 and carries a follower 51 that is received in the slot 57.

An elongated tube 58 of generally square-shaped cross section extends parallel to the top of the tool bar 36 and is received within the ends of the upper links 44 which are pivotably coupled to the brackets 46. The central portion of the tube 58 is within one end of a link 60 extending outwardly from the tube 58 and having the opposite end thereof coupled to the piston of a hydraulic cylinder 62 mounted on the side of the tool bar 36. Actuation of the cylinder 62 causes rotation of the tube 58 to cause pivoting movement of the upper links 44 and the lower links 48. This results in up and down movement of the tow tube 40 relative to the tool bar 36. The wheel 38 tends to maintain the tool bar 36 a fixed distance above the ground. With the cylinder 62 unactivated, the tube 58 assumes a particular angular position so as to hold the tow tube 40 in an operative position as shown in FIG. 3. When in the operative position, the tow tube 40 is disposed a fixed first distance from the ground to dispose the shovel 24 and the press wheel 26 at selected depths within the ground for plowing, seed dispensing and soil compacting.

Figure 6:
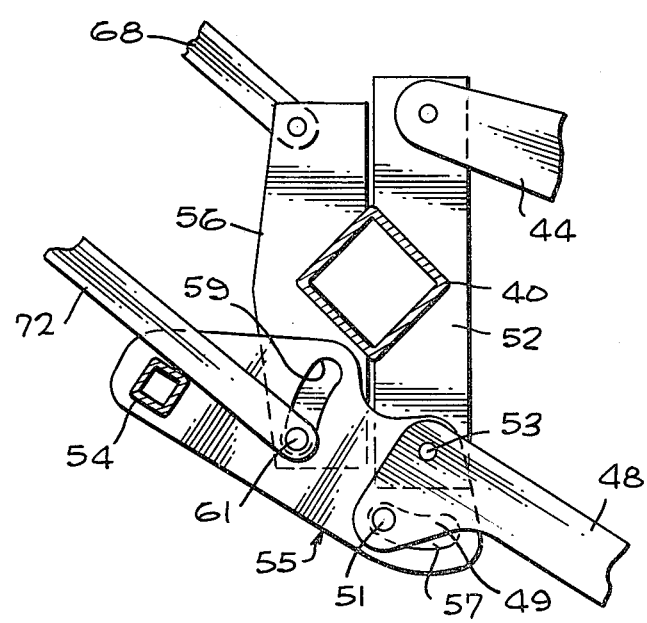
FIG. 6 is an enlarged side view of part of the drill portion shown in FIG. 5.

When the press grain drill 10 is being towed to or from a planting operation, it is necessary that the opener units 22 be raised out of the ground so that the shovel 24 and the press wheel 26 are disposed well above the ground. This is accomplished in accordance with the invention by activating the hydraulic cylinder 62 to rotate the tube 58 and thereby lift the tow tube 40 via the upper and lower links 44 and 48 into a towing position in which the tow tube 40 is a fixed second distance from the ground greater than the fixed first distance. This position is shown in FIGS. 5 and 6. As the tow tube 40 is being raised relative to the tool bar 36, the follower or pin 51 on the pivoting lower link 48 moves rearwardly in the slot 57 until it reaches the end thereof and thereafter the bracket 55 raises the attached lift tube 54 into contact with the opener units 22 so as to raise the opener units 22 relative to the tow tube 40 as shown in FIG. 6. When the press grain drill 10 has been towed to a place where work is to begin, the cylinder 62 is deactivated so as to rotate the tube 58, pivot the upper and lower links 44 and 48, and lower the tow tube 40 into the operative position. At the same time, the lift tube 54 is lowered out of the way of the opener unit 22 permitting the shovel 24 to penetrate the ground together with the press wheel 26 as the press grain drill 10 is pulled along the ground in the direction shown by an arrow 63.

The lift tube 54, as shown in FIGS. 3 and 4, separates from the underside of a supporting or connecting link 72 forming a part of the opener unit 22 when the latter is in the operative position. The link 72 is pivotably mounted on the bracket 56 by the pin 61. The tube 54 limits downward movement of the opener unit 22 as shown in dotted representation in FIG. 4. The latter condition occurs only when the units pass over a large dip or hole in the ground such as at a ditch.

A comparison of FIGS. 4 and 6 shows that as the tow tube 40 is raised from the operative position to the towing position by upward movement of the link 48, the link 48 pivots about the pin 53 causing the pin 51 to move along the slot 57 in the bracket member 55. When the pin 51 engages the opposite end of the slot 57, the bracket member 55 pivots upwardly about the pin 53, raising the lift tube 54 into engagement with the link 72 of the opener unit 22. The bracket member 55 and the lift tube 54 provide a mechanical advantage by pivoting the opener unit upwardly relative to the tow bar 40. Thus the tow bar 40 must be raised only a relatively small distance between the operative and towing positions in order to raise the shovel and press wheel a substantial distance above the ground.

In accordance with the invention, each of the opener units 22 is a self-penetrating unit which exerts a substantially constant downward force on the shovel 24 and the press wheel 26 without the need for weights mounted thereon such as a seed box, and in which the press wheel 26 determines the depth of the shovel 24 within the ground. The shovel 24 and the press wheel 26 are coupled to the brackets 56 of the auxiliary frame formed by the tow tube 40 by a plurality of pivotably coupled elongated elements forming a pair of variable parallelograms. Each incremental change in the vertical position of the shovel 24 relative to the tow tube 40 has an accompanying change in the vertical position of the press wheel 26 relative to the tow tube 40 by an amount which is greater than and forms a fixed ratio with the incremental change of the shovel 24. This facilitates positioning of the shovel 24 and the press wheel 26 at selected depths within the ground, and maintains such depths and the difference therebetween constant. The shovel 24 which can be of conventional design is made self-penetrating by mounting the shovel to form a relatively small angle relative to the ground. As the opener unit 22 is pulled forward, the shovel 24 penetrates the ground and tries to go as deep as possible. However, the shovel 24 is restrained by the press wheel 26 when the desired shovel depth is reached. As the shovel tries to penetrate deeper in the soil, the press wheel 26 moves downwardly at a greater rate due to the parallelogram action to restrain the shovel 24 and maintain it at the desired depth.

FIG. 3 shows one of the opener units 22 in the operative position. The shovel 24, which is disposed within the ground at a selected depth, plows a furrow as the press grain drill 10 advances along the ground in the direction of the arrow 63. At the same time, the seed is metered from the seed dispenser 32 and is conveyed by one of the hoses 30 to the shovel 24 where it is deposited at the bottom of the furrow in well-known fashion. As the shovel 24 passes, much of the loose soil plowed out of the furrow falls back into the furrow. The press wheel 26, the depth of which is maintained at a selected difference D from the depth of the shovel 24, compacts the loose soil which has fallen back into the furrow so that uniformly compacted soil of selected depth D resides over the planted seeds. This operation is further illustrated in FIG. 9, which is a cross-sectional illustration of the furrow 28 within the ground. The furrow 28 is dug to a selected depth $D_1$ by the shovel 24 while at the same time seeds 64 are deposited in the bottom of the furrow by the shovel. As the shovel 24 passes, the loose soil falls back into the furrow as shown by the dashed line 66. The following press wheel 26, which is disposed at a selected depth $D_2$ within the ground, compacts the loose soil at the center of the furrow 28 so that the selected thickness D of compacted soil resides over the seeds 64.

Referring again to FIG. 3, the opener unit 22 includes a first elongated element in the form of a tow link 68 having a first end 70 pivotably coupled to an upper portion of the bracket 56. A second elongated element in the form of the tow link 72 of considerably greater length than the tow link 68 has a first end 74 thereof pivotably coupled on the pin 61 on the lower portion of the bracket 56. The pin 61 is vertically spaced apart from the pivotable coupling of the first tow link 68 to the bracket 56. The tow link 72 has a first portion 76 thereof which extends from the first end 74 to an intermediate pin 78 and which is substantially equal in length to the first tow link 68. A second portion 80 of the tow link 72 extends from the intermediate pin 78 to the second end 82 of the tow link 72. A third elongated member in the form of a hollow shank 84 has a first end 86 thereof pivotably coupled to a second end 88 of the first tow link 68, and an intermediate portion 90 thereof pivotably coupled to the intermediate portion of the tow link 72 at the pin 78. The portion of the shank 84 between the first end 86 and the intermediate portion 90 defining a first portion 92 of the shank is approximately equal in length to the distance between the pivotable coupling of the first end 70 of the tow link 68 to the bracket 56 and the pivotable coupling of the first end 74 of the tow link 72 to the bracket 56. Accordingly, the tow link 68, the first portion 76 of the tow link 72, the first portion 92 of the shank 84 and the bracket 56 form a first parallelogram 94 which is variable in shape because of the pivotable coupling of the four different sides.

A second portion 96 of the hollow shank 84 extends between the intermediate portion 90 and a second end 98. The shovel 24 is mounted on the shank 84 at the second end 98. A fourth elongated element in the form of a link 100 has a first end 102 thereof pivotably coupled to the second end 82 of the tow link 72. A fifth elongated element in the form of a link 104 has a first end 106 thereof pivotably coupled to the shank 84 adjacent the second end 98 of the shank, and a second end 108 thereof pivotably coupled to a second end 110 of the link 100.

The link 104 is generally parallel to and approximately equal in length to the second portion 80 of the tow link 72. Similarly, the link 100 is generally parallel to and approximately equal in length to the second portion 96 of the shank 84 between the intermediate portion 90 and the point of coupling of the first end 106 of the link 104 thereto. Accordingly, the link 104, the second portion 80 of the tow link 72, the link 100, and the second portion 96 of the shank 84 form a second parallelogram 112 which is variable in shape because of the pivotable coupling of the four sides thereof. The second end 110 of the link 100 is coupled via a castored mounting 114 to the press wheel 26.

It will be observed that the parallelograms 94 and 112 share two common members, one being the tow link 72 and the other being the shank 84. The first parallelogram 94 changes shape to permit vertical movement of the shovel 24 relative to the tow tube 40. At the same time, the press wheel 26 undergoes vertical movement relative to the tow tube 40 as the parallelogram 112 undergoes a change in shape. As a result of the presence of the two parallelograms 94 and 112 and the fact that both function to position the press wheel 26 relative to the tow tube 40, the press wheel 26 undergoes a change in position relative to the tow tube 40 which is equal to the change in position of the shovel 24 plus an additional change provided by the action of the parallelogram 112.

Accordingly, the rate of change of the press wheel 26 is greater than and forms a fixed ratio with the rate of change of the shovel 24. Such arrangement is utilized in accordance with the invention to enable the press wheel 26 to determine the depth of the shovel 24 within the ground, and to maintain the depths of the press wheel 26 and the shovel 24 and the difference therebetween substantially constant. As previously noted the self-penetrating shovel 24 which seeks to go as deeply into the ground as possible is restrained by the press wheel 26 when the desired shovel depth is reached. Upward or downward movements of the shovel 24 from the desired depth are checked by the press wheel 26 which due to the parallelogram action moves faster than the shovel. The tow tube 40 continues to remain substantially at the fixed first distance from the ground and to tow the various different opener units 22 when in the operative position. The opener units 22 in turn maintain the depths of the shovels 24 and the press wheels 26 substantially constant as the terrain varies.

Referring again to FIG. 3, the opener unit 22 includes a sixth elongated element 120 having a first end 122 thereof commonly pivotably coupled to the upper end of the bracket 56 with the first end 70 of the tow link 68 and an opposite second end 124 pivotably coupled to one end of a seventh elongated element 126. The other end of the seventh elongated element 126 is pivotably coupled to the tow link 72 at an intermediate point in the first portion 76. The second end 124 of the elongated element 120 and the coupled end of the elongated element 126 are also coupled to one end of a spring 128 having the opposite end thereof coupled to the tow link 68 adjacent the first end 70.

Referring again to FIG. 3, as the tow links 68 and 72 pivot upwardly from the horizontal with increases in the angle "a", the elements 120 and 126 pivot relative to each other to lengthen the spring 128. Lengthening of the spring 128 provides a tension which results in a downward force on the opener unit 22. Because of the various angles of the elongated elements 120 and 126, this downward force is a maximum when the angle "a" is 0° and decreases with increasing values of the angle "a". The draft load F on the shovel 24 produced by the ground is made up of the horizontal component $F_y$ and the vertical component $F_x$. As a result of the parallelogram action, the horizontal force component $F_y$ produces a downward force on the opener unit 22 which exists for values of the angle "a" other than 0° and which increases as the angle "a" increases. This force produced by the draft load F combines with the force produced by the spring 128 to provide a substantially constant downward force on the opener unit 22. This combined force, which adds to the constant downward force produced by the weight of the unit 22 and the vertical component $F_x$ of the draft load F, remains substantially constant for different values of the angle "a" and provides for uniform soil compaction and relatively constant shovel and press wheel depths for varying angles of the opener unit 22 such as may be caused by irregular terrain. This is discussed in greater detail hereafter in connection with FIGS. 10-12.

The links 68, 72 will normally operate at an incline to the horizontal and the resultant combined forces referred to above will set the shovel at the desired depth. Should, however, a draft force F be applied to the shovel tending to force the shovel deeper into the ground, such will be resisted by the wheel 26. Since the length of link 72 is twice the length of link 68 any additional downward movement of the shovel 24 would require the wheel 26 to move downward twice the movement. This would, of course, not happen and the shovel is prevented from penetrating deeper than the predetermined setting.

The ratio of the rate of change of the shovel 24 to that of the press wheel 26 is determined by the relative sizes of the parallelograms 94 and 112 as determined by the relative lengths of the first and second portions 76 and 80 of the tow link 72. It has been found that best results are achieved if the length of the second portion 80 of the tow link 72 is at least as long as the first portion 76 providing a ratio of 1:2 between the rates of movement of the shovel 24 and the press wheel 26. In the example of FIG. 7, the second portion 80 is approximately 1.5 times the length of the first portion 76, providing a ratio of 1:2.5. Ratios as high as 1:3 or higher may be found appropriate for various applications of the invention.

For any given angle "a" the difference D between the depths of the shovel 24 and the press wheel 26 remains constant and can be adjusted by varying the position of the castored mounting 114 at the pivotable coupling of the elongated elements 100 and 104. This adjustment is accomplished by raising or lowering the castored mounting 114 of the press wheel 26 relative to the second end 108 of the link 104 and the second end 110 of the link 100. An adjustment in the difference D results in a change in the shovel depth. Moreover, although D and the shovel depth may vary slightly with changes in the angle "a", they remain relatively constant over a small range of values of "a" once the castored mounting 114 is set to the desired level.

As seen in FIGS. 1 and 2, alternate opener units 22 along the length of the press grain drill 10 position the shovels and the press wheels thereof well forward of the shovels and press wheels of the intervening opener units 22. FIGS. 3 and 5 illustrate the curved shank embodiment of the opener unit 22 in which the shank 84 curves first in one direction and then in the opposite direction along the length thereof. This positions the shovels 24 and the press wheels 26 well behind the main frame tool bar 36 and the tow tube 40. In the intervening opener units 22 shown in FIGS. 7 and 8, the shank 84 is straight along substantially the entire length thereof. The elongated element 100 assumes a more vertical position than in the embodiment of FIGS. 3 and 5 so as to be substantially parallel to the portion of the shank 84 bounding the parallelogram 112 and is accordingly shorter in length than the corresponding elongated element 100 in the embodiment of FIGS. 3 and 5. The substantially straight shank 84 in the opener unit arrangement of FIGS. 7 and 8 enables the shovels 24 and the press wheels 26 to be located well forward of the shovels and press wheels of adjacent opener units, while at the same time providing for use of the common tow tube 40 and associated brackets 56 by all of the opener units 22. The operation of the opener unit 22 illustrated in FIGS. 7 and 8 is virtually identical to that of the embodiment of FIGS. 3 and 5.

As previously described, movement of the press grain drill 10 into the towing position is accomplished by energizing the hydraulic cylinder 62 to pivot the links 44 and 48 upwardly relative to the tool bar 36 and thereby raise the tow tube 40 higher off the ground. At the same time, the lift tube 54 is raised into engagement with the tow link 72 causing the tow link 72 and the parallel tow link 68 to pivot upwardly relative to the bracket 56. This causes the opener unit 22 to be raised relative to the tow tube 40 in addition to raising the tow tube 40 relative to the tool bar 36, thereby insuring ample clearance between the shovel 24 and the press wheel 26 and the ground. FIG. 5 illustrates the press grain drill in the raised or towing position and the corresponding position of the curved shank opener unit of FIG. 3. FIG. 8 is a similar view for the straight shank opener unit of FIG. 7 and with the frame portion of the press grain drill, which assumes the same position as shown in FIG. 5, eliminated for simplicity of illustration.

FIGS. 10-12 provide a further detailed explanation of the manner in which press grain drills according to the invention function to provide a constant downward force or pressure on the opener units 22 for varying angles of the opener units. FIG. 10 depicts in simplified diagrammatic fashion a portion of the opener unit 22 including the parallelogram 94, the shank 84 and the shovel 24 for a relatively large value of the angle "a". FIG. 11 is like FIG. 10 except that the angle "a" is considerably smaller. FIG. 12 is a diagrammatic plot as a function of the angle "a" of the downward force on the opener unit 22 due to the parallel link angle, the downward force due to the spring 128 and the total downward force provided by the combination thereof.

It was previously noted that the self-penetrating shovel 24 encounters a draft force F having a horizontal component $F_y$. The horizontal force component $F_y$ which is shown in FIG. 10 results in a force $F_a$ on the shank 84 at a point 140 where the tow link 72 is pivotably coupled to the shank 84. The horizontal force component $F_y$ also results in a force $F_b$ on the shank 84 at a point 142 where the tow link 68 is pivotably coupled to the shank 84. The forces $F_a$ and $F_b$ are in opposite directions from one another with the force $F_a$ being the larger of the two due to its closer proximity to the shovel 24. The force $F_a$ which is exerted to the left and downwardly has a vertical component $F_{ay}$ which is directed downwardly as shown in FIG. 10. The force $F_b$ which is exerted upwardly and to the right as seen in FIG. 10 has a vertical component $F_{by}$ which is directed upwardly. The vertical forces $F_{ay}$ and $F_{by}$ algebraically combine to provide a force $F_c$ on the opener unit 22. Since $F_{ay}$ is larger than $F_{by}$, the combined force $F_c$ is in a downward direction.

The diagrammatic representation in FIG. 11 is like that of FIG. 10 except that the angle "a" is considerably smaller. Consequently the force $F_a$ has a smaller vertical component $F_{ay}$. Likewise, the force $F_b$ has a smaller vertical component $F_{by}$. As a result the combined force $F_c$ is considerably smaller in FIG. 11 than in FIG. 10. As seen in FIG. 12 the combined downward force $F_c$ varies generally linearly with the angle "a" from zero when the opener unit is horizontal and the angle "a" is 0° to larger and larger values as the angle "a" increases.

Referring again to FIG. 10 the spring 128 is held in tension by the elongated elements 120 and 126. The resulting force at a point 144 where the spring 128 is coupled to the elements 120 and 126 has a component $F_d$ which is in a downward direction and which tends to force the opener unit 22 into a horizontal position. However, because the elongated element 126 forms a relatively small angle with the spring 128 and a large angle with the tow link 72, the force $F_d$ is of relatively small value. The force $F_d$ combines with the force $F_c$ to provide a total downward force $F_t$ on the opener unit 22.

FIG. 11 shows that as the angle "a" becomes smaller the elongated element 126 pivots relative to the tow link 72 in response to the tension of the spring 128 so as to form a smaller angle with the tow link 72 and a larger angle with the spring 128. Because of the change in the angles of the elongated elements 120 and 126, the downward force $F_d$ due to the tension of the spring 128 increases for decreasing values of the angle "a" despite the fact that the tension of the spring 128 decreases slightly. Consequently the downward force $F_d$ due to the spring 128 is considerably larger for the angular position shown in FIG. 11 than for the angular position shown in FIG. 10, thereby compensating for the reduction in the downward force $F_c$ in the FIG. 11 position. Consequently, the total downward force $F_t$ in FIG. 11 is substantially equal to $F_t$ in the FIG. 10 angular position and for other angular positions as well.

As shown in FIG. 12 the downward force $F_d$ due to the spring 128 varies almost linearly as a function of the angle "a". The force $F_d$ decreases from a maximum value when the opener unit 22 is in the horizontal position an the angle "a" is 0° to increasingly smaller values as the angle "a" increases. As shown in FIG. 12 the forces $F_c$ and $F_d$ combine to produce a total downward force $F_t$ which is substantially constant for different values of the angle "a".

In an arrangement of press grain drills constructed and successfully tested in accordance with the invention, each press grain drill was approximately twelve feet in length and had eleven opener units 22 mounted thereon. The depth of each shovel within the ground was adjustable from 40 to 125 millimeters. The opener units were arranged so that the angle "a" could vary between $-5°$ and $+30°$. A total vertical force of about 200 to 400 N was determined to be present at each opener unit 22. This force remained substantially constant for different depths of the shovel and press wheel. The shovels and press wheels continued to be disposed at substantially constant depths within the ground for a variety of different terrain conditions.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An arrangement for mounting a self-penetrating shovel and a soil compacting device on a frame disposed above the ground in a press grain drill comprising first means movably coupling the shovel to the frame, the first means disposing the shovel at a given pitch relative to the ground and providing for generally up and down movement of the shovel relative to the frame while substantially maintaining the given pitch, and second means movably coupling the soil compacting device to the shovel, the second means being responsive to movement of the shovel relative to the frame in a given direction to move the soil compacting device relative to the shovel in the given direction.

2. The invention set forth in claim 1, wherein the first and second means provide for generally vertical movement of the shovel and the soil compacting device.

3. In a press grain drill, an arrangement for mounting a self-penetrating shovel and a soil compacting device on a frame which is disposed above and moved along the ground comprising a pivoting mechanism coupled to the frame and having the soil compacting device coupled to an end portion thereof opposite the frame and the shovel coupled to an intermediate portion thereof between the soil compacting device and the frame, the pivoting mechanism being operative to dispose the shovel in the ground at a given pitch and to move the shovel generally up and down relative to the frame to maintain the shovel in the ground at substantially the given pitch, the pivoting mechanism being operative in response to each upward movement of the shovel relative to the frame to move the soil compacting device upwardly relative to the shovel and being operative in response to each downward movement of the shovel relative to the frame to move the soil compacting device downwardly relative to the shovel.

4. The invention set forth in claim 3, wherein the pivoting mechanism is operative to move the soil compacting device up and down relative to the shovel by an amount bearing a fixed ratio to the amount of up and down movement of the shovel relative to the frame.

5. A press grain drill comprising main frame means, wheel means depending from and supporting the main frame means at a generally fixed distance above the ground, auxiliary frame means, means coupling the auxiliary frame means to the main frame means, the means coupling being operative to permit movement of the auxiliary frame between an operative position in which the auxiliary frame means is a generally fixed first distance above the ground and a towing position in which the auxiliary frame means is a generally fixed second distance above the ground greater than the fixed first distance, means for selectively moving the auxiliary frame means into the operative position or the towing position, a plurality of opener units coupled to the auxiliary frame means, the opener units being disposed in an operative position upon the ground when the auxiliary frame means is in the operative position and being raised clear of the ground when the auxiliary frame means is in the towing position, and means coupled to the auxiliary frame means for raising the opener units relative to the auxiliary frame means as the auxiliary frame means is moved into the towing position.

6. The invention set forth in claim 5, wherein each of the opener units includes a plurality of elongated elements pivotably coupled to the auxiliary frame means and to each other and mounting a shovel and a press wheel, and the means for raising the opener units comprises a common member operative to engage one of the elongated elements of each of the opener units and pivot the engaged elongated element upwardly relative to the auxiliary frame means whenever the auxiliary frame means is moved into the towing position.

7. The invention set forth in claim 5, wherein each of the opener units includes a shovel, first means coupling the shovel to and providing for movement of the shovel relative to the auxiliary frame means, a press wheel, and second means coupling the press wheel to and providing for movement of the press wheel relative to the auxiliary frame means in response to movement of the shovel relative to the auxiliary frame means, the press wheel moving relative to the auxiliary frame means by an amount greater than and having a fixed ratio with the amount of movement of the shovel relative to the auxiliary frame means, and the means for raising the opener units relative to the auxiliary frame means is operative to engage the first means and the second means and cause upward movement of the shovel and the press wheel relative to the auxiliary frame means whenever the auxiliary frame means is moved into the towing position.

8. The invention set forth in claim 5, wherein the opener units are pivotably coupled to the auxiliary frame means and the means for raising the opener units relative to the auxiliary frame means whenever the auxiliary frame means is moved into the towing position comprises bracket means pivotably coupled to the auxiliary frame means and including means mounted thereon for engaging and pivoting the opener units upwardly in response to upward pivoting movement of the bracket means, and means responsive to movement of the auxiliary frame means from the operative position to the towing position for pivoting the bracket means upwardly.

9. The invention set forth in claim 8, wherein the means for engaging is located a greater distance from the pivotable coupling of the bracket means to the auxiliary frame means than from the pivotable coupling of the opener units to the auxiliary frame means to provide a mechanical advantage.

10. An arrangement for mounting a shovel and a press wheel on a frame in a press grain drill, the frame being maintained a generally fixed distance from the ground during use of the press grain drill, comprising first means coupling the shovel to the frame, the first means permitting movement of the shovel relative to the frame to position the shovel within the ground at a selected depth, and second means coupling the press wheel to the frame, the second means including at least a portion of the first means and permitting movement of the press wheel relative to the frame to position the press wheel within a furrow plowed by the shovel at a selected depth which is different by a selected amount from the selected depth of the shovel, the second means being operative to move the press wheel relative to the frame by an amount greater than and forming a fixed ratio with each amount of movement of the shovel relative to the frame to maintain the depth of the press wheel different by the selected amount from the depth of the shovel for terrain variations in the ground, the first means comprising a first plurality of elongated elements pivotably coupled to each other between the shovel and the frame to form a first parallelogram which varies in shape as the shovel moves relative to the frame and the second means comprising a second plurality of elongated elements pivotably coupled to each other between the first plurality of elongated elements and the press wheel to form a second parallelogram which varies in shape as the shovel moves relative to the frame.

11. The invention defined in claim 10, wherein each variation in the shape of the first parallelogram accompanying a first amount of movement of the shovel relative to the frame produces a corresponding variation in the shape of the second parallelogram to produce a second amount of movement of the press wheel relative to the first parallelogram and a total movement of the press wheel relative to the frame equal to the first amount of movement plus the second amount of movement.

12. The invention defined in claim 10, wherein the first and second parallelograms are comprised of two common elongated elements.

13. The invention defined in claim 10, wherein one of the first plurality of elongated elements comprises the first portion of an element common to both the first and second parallelograms and one of the second plurality of elongated elements comprises the second portion of the common element, the relative lengths of the first and second portions of the common element determining said fixed ratio of movement of the press wheel and the shovel relative to the frame.

14. A press grain drill comprising an elongated main frame tool bar, wheel means depending from and supporting the main frame tool bar generally parallel to and at a generally fixed distance above the ground, an elongated tow tube disposed parallel to and spaced apart from the main frame tool bar, a plurality of pairs of links spaced along the lengths of the main frame tool bar and the tow tube, each pair of links being pivotably coupled to the main frame tool bar and to the tow tube to permit movement of the tow tube relative to the main frame tool bar, means coupled to the main frame tool bar for selectively moving the tow tube relative to the main frame tool bar between an operative position at a first generally fixed distance above the ground and a towing position at a second generally fixed distance above the ground which is greater than the first generally fixed distance, a plurality of opener units coupled to the tow tube along the length thereof and each having a shovel and a press wheel, the shovel and the press wheel of each opener unit being disposed on the ground when the tow tube is in the operative position and being raised clear of the ground when the tow tube is in the towing position, each opener unit including an elongated member pivotably coupled to the tow tube, and an elongated lift tube coupled to the pairs of links and disposed generally parallel to the tow tube, the lift tube being disposed below the elongated member of each opener unit when the tow tube is in the operative position, and being operative to engage and raise the elongated member of each opener unit relative to the tow tube as the tow tube is moved into the towing position.

15. The invention set forth in claim 14, wherein each opener unit includes in addition to the elongated member a second elongated member pivotably coupled to the tow tube and extending generally parallel to the first-mentioned elongated member, a third elongated member pivotably coupled to the second elongated member and the first-mentioned elongated member and having the shovel mounted at the lower end thereof, a fourth elongated member pivotably coupled to the first-mentioned elongated member on the opposite side of the third elongated member from the tow tube and generally parallel to the third elongated member, the fourth elongated member having the press wheel mounted at the end thereof, and a fifth elongated member extending between and pivotably coupled to the third and fourth elongated members between the first-mentioned elongated member and the shovel and press wheel.

16. The invention set forth in claim 14, wherein the elongated lift tube is coupled to the pairs of links by a plurality of brackets, each bracket being coupled to the tow tube at a common pivot point with the lower one of a different pair of links and having first and second curved slots therein and the lift tube mounted therein, the lower one of the pair of links having a pin mounted thereon and extending into the first curved slot and the elongated member of the opener unit being pivotably coupled to the tow tube through the second curved slot.

17. An arrangement for mounting a shovel and a press wheel on a frame in a press grain drill comprising:
a first elongated member pivotably coupled at a first end thereof to the frame at a first location on the frame;
a second elongated member pivotably coupled at a first end thereof to the frame at a second location on the frame spaced apart from the first location;
a third elongated member pivotably coupled at a first end thereof to a second end of the first elongated member and at a central portion thereof to a central portion of the second elongated member, a second end of the third elongated member being coupled to the shovel;
a fourth elongated member pivotably coupled at a first end thereof to a second end of the second elongated member and coupled at a second end thereof to the press wheel; and
a fifth elongated member pivotably coupled at a first end thereof to the third elongated member adjacent the second end of the third elongated member and at a second end thereof to the second end of the fourth elongated member.

18. The invention set forth in claim 17, further including a sixth elongated member pivotably coupled at a first end thereof to the frame at the first location on the frame, a seventh elongated member having a first end thereof pivotably coupled to a second end of the sixth elongated member and a second end thereof pivotably coupled to the second elongated member adjacent the central portion thereof, and elongated spring means having a first end coupled to the first end of the seventh elongated member and a second end coupled to the first elongated member adjacent the first end thereof.

19. The invention set forth in claim 17, wherein the third elongated member curves in one direction and then in an opposite direction along the length thereof.

20. The invention set forth in claim 17, wherein the third elongated member is relatively straight along the entire length thereof.

21. The invention set forth in claim 17, wherein the second elongated member is comprised of a first portion between the first end and the central portion approximately equal in length to the first elongated member and a second portion between the central portion and the second end approximately equal in length to the fifth elongated member, and the third elongated member is comprised of a first portion between the first end and the central portion approximately equal in length to the distance between the first location and the second location on the frame and a second portion between the central portion and the first end of the fifth elongated member approximately equal in length to the fourth elongated member.

22. The invention set forth in claim 21, wherein the second portion of the second elongated member is at least as long as the first portion of the second elongated member, and the second portion of the third elongated member is at least as long as the first portion of the third elongated member.

23. The invention as set forth in claim 17, wherein the second end of the fourth elongated member is coupled to the press wheel by a castored mounting having an adjustable length.

* * * * *